(12) United States Patent
Oglesby

(10) Patent No.: US 8,056,251 B1
(45) Date of Patent: Nov. 15, 2011

(54) TOP PLATE ALIGNMENT TEMPLATE DEVICE

(75) Inventor: Kenneth Doyle Oglesby, Tulsa, OK (US)

(73) Assignee: Regency Technologies LLC, Tulsa, OK (US)

( * ) Notice: Subject to any disclaimer, the term of this patent is extended or adjusted under 35 U.S.C. 154(b) by 0 days.

(21) Appl. No.: 12/886,655

(22) Filed: Sep. 21, 2010

Related U.S. Application Data

(60) Provisional application No. 61/277,128, filed on Sep. 21, 2009.

(51) Int. Cl.
*G01B 5/25* (2006.01)
(52) U.S. Cl. .............................................. 33/562; 33/645
(58) Field of Classification Search ..................... 33/562, 33/613, 645
See application file for complete search history.

(56) References Cited

U.S. PATENT DOCUMENTS

| | | | |
|---|---|---|---|
| 1,780,867 A | 5/1929 | Cornella | |
| 1,790,460 A | 10/1929 | Capeliuschnicoff | |
| 1,868,825 A | 8/1930 | Grosjean | |
| 2,108,779 A | 8/1933 | Schafer et al. | |
| 2,202,683 A | * 5/1940 | Baegen et al. | 33/562 |
| 2,362,750 A | 11/1944 | Hayward | |
| 2,367,185 A | 1/1945 | Cary | |
| 2,660,402 A | 12/1949 | Devine et al. | |
| 2,937,008 A | 9/1956 | Whittle | |
| 2,944,792 A | 5/1957 | Gros | |
| 3,027,471 A | 4/1960 | Burgwin et al. | |
| 3,076,514 A | 2/1963 | Garrison | |
| 3,104,619 A | 9/1963 | Swartout | |
| 3,132,595 A | 5/1964 | Bower | |
| 3,749,529 A | 7/1973 | Cornelsen | |
| 3,759,057 A | 9/1973 | English et al. | |
| 3,818,805 A | 6/1974 | Johansson | |
| 3,818,807 A | 6/1974 | Semple | |
| 3,938,596 A | 2/1976 | Ivanov et al. | |
| 3,971,450 A | 7/1976 | Fox | |
| 4,023,469 A | 5/1977 | Miller | |
| 4,060,141 A | 11/1977 | Catterfeld | |
| 4,086,029 A | 4/1978 | Crane et al. | |
| 4,157,057 A | 6/1979 | Bailey | |
| 4,194,861 A | * 3/1980 | Keller | 408/109 |
| 4,378,183 A | 3/1983 | Ackerman | |
| 4,476,771 A | 10/1984 | Kao | |
| 4,505,031 A | 3/1985 | Colwell et al. | |
| 4,519,753 A | 5/1985 | Kitsnik | |
| 4,576,242 A | 3/1986 | Mundell | |
| 4,598,630 A | 7/1986 | Kao | |
| 4,606,700 A | 8/1986 | Brudny-Chelyadinov et al. | |
| 4,691,620 A | 9/1987 | Kao | |

(Continued)

FOREIGN PATENT DOCUMENTS

GB 709608 5/1954

(Continued)

*Primary Examiner* — G. Bradley Bennett
(74) *Attorney, Agent, or Firm* — Head, Johnson & Kachigian, P.C.

(57) ABSTRACT

A top plate alignment template device for subterranean drilling or boring. The template device includes a frame receivable on a ground site. A plurality of tubular guide bores are provided on the frame, with each of the guide bores arranged at an angle extending downwardly and outwardly from the frame. In one embodiment, each of the guide bores has an axis so that the axes of the guide bores extend from a common center point above the frame.

24 Claims, 8 Drawing Sheets

U.S. PATENT DOCUMENTS

| | | |
|---|---|---|
| 4,692,105 A | 9/1987 | Leroy |
| 4,773,489 A | 9/1988 | Makohl |
| 4,963,077 A | 10/1990 | Besic et al. |
| 5,047,012 A | 9/1991 | Leuschner et al. |
| 5,118,227 A | 6/1992 | Gregorio Garcia |
| 5,118,263 A | 6/1992 | Fritchman |
| 5,437,338 A | 8/1995 | Martin et al. |
| 5,460,496 A | 10/1995 | Van-Drentham Susman |
| 5,518,379 A | 5/1996 | Harris et al. |
| 5,597,264 A * | 1/1997 | Laak ................. 33/613 |
| 5,701,797 A | 12/1997 | Mohn |
| 5,741,710 A | 4/1998 | Ek |
| 5,785,509 A | 7/1998 | Harris et al. |
| 5,833,444 A | 11/1998 | Harris et al. |
| 5,853,052 A | 12/1998 | Baiden et al. |
| 5,918,728 A | 7/1999 | Syverson |
| 5,939,813 A | 8/1999 | Schob |
| 6,109,839 A * | 8/2000 | Thomas ................. 33/562 |
| 6,290,475 B1 | 9/2001 | Snow |
| D499,022 S * | 11/2004 | Sun ................. D9/432 |
| 6,892,466 B2 * | 5/2005 | Kurz et al. ................. 33/562 |
| 6,920,946 B2 | 7/2005 | Oglesby |
| 6,954,989 B1 * | 10/2005 | Morton ................. 33/194 |
| 7,055,629 B2 | 6/2006 | Oglesby |
| 7,118,349 B2 | 10/2006 | Oglesby |
| 7,794,215 B2 | 9/2010 | Oglesby |
| 2009/0000137 A1* | 1/2009 | Diaz ................. 33/562 |
| 2009/0227185 A1 | 9/2009 | Summers et al. |
| 2010/0207945 A1* | 8/2010 | Kirsch ................. 33/562 |

FOREIGN PATENT DOCUMENTS

| | | |
|---|---|---|
| SU | 561004 | 5/1977 |

\* cited by examiner

TOP PLATE ALIGNMENT TEMPLATE DEVICE

CROSS-REFERENCE

This application claims priority to U.S. Provisional Patent Application Ser. No. 61/277,128, filed Sep. 21, 2009, incorporated in its entirety herein by reference.

BACKGROUND OF THE INVENTION

1. Field of the Invention

The present invention relates to a top plate alignment template and platform device for simply and easily installing multiple pipes, tubes, hoses or rods at multiple angles into the ground from a small surface site. In particular, the present invention is directed to a top plate alignment template and platform device which may be utilized for ground source heat pump installation applications, for anchoring applications, and for installing geophone equipment in seismic applications.

2. Prior Art

Subterranean pipes, tubes, hoses or rods are used in multiple types of applications. One example is ground source heat pumps used in heating and cooling systems for buildings. The earth is utilized as a heat source in the winter and as a heat sink in the summer. A fluid circulation loop is used to exchange heat between the earth and a building. A pump moves the fluid from a heat exchanger through the loop beneath the surface of the earth to exchange heat with the ground before returning to the surface. The fluid loop pipe will contain a mixture of fluid, such as freon, water and antifreeze. A series of pipes or tubes will typically run somewhat vertically in the ground through holes bored from fifty (50) to five hundred (500) feet deep. Pairs of pipes are joined with a u-shaped connector in order to deliver the fluid downhole and then return the fluid to the surface. The pipes are typically installed at regular distances apart from each other, such as twenty (20) feet apart. The bore holes may be filled with a grout surrounding the pipes to provide a thermal connection to the grounding soil or rock. This installation requires moving the drilling equipment multiple times for multiple bores and results in considerable time and surface site disturbance.

Another example is in anchoring applications, where a single or multiple holes are created. A solid core tube or a cable is then installed beneath the surface and grouted into place. Alternatively, rods can be driven into the ground. Anchoring devices can be used for various applications. A non-limiting example would be anchoring of a floating rig or platform to a seabed or to a sea floor.

A further example of another application is detection of seismic signals utilizing sensors in bores beneath the surface of the earth surface. A number of acoustic sensors, such as subterranean geophones convert ground movement to voltage. The geophones are inserted in boreholes delivered to multiple locations beneath the earth. The geophones are utilized to detect seismic activity from the earth or, alternatively, to detect seismic signals that are manmade. The data recovered may be used for tracking seismic activity such as earthquakes. The data may also be utilized for plotting subsurface conditions, such as to predict subterranean oil and gas deposits. Seismic waves produced by explosions or vibration controlled sources are a primary method of underground exploration.

While it is possible to drill multiple holes or bores with drilling or boring equipment, there are costs associated with setting up the drilling equipment and taking down the drilling equipment for each separate bore to be drilled. It would be advantageous to achieve faster mobilization to provide a system with less tear down, moving and set up time and expense than required when drilling multiple bores.

It would also be advantageous to provide a system with the smallest possible surface footprint for drilling or boring multiple subterranean bores.

It would also be advantageous in anchoring applications to have the firmest grip permissible from a single location.

It would also be advantageous to provide a top plate alignment template device that can be installed in a cavity in the ground and then cemented in place to form a solid platform for drilling or boring equipment for multiple holes or bores.

It would also be advantageous to provide a top plate alignment template device that can be utilized as a temporary form for drilling and boring equipment and that may later be removed.

SUMMARY OF THE INVENTION

The present invention is directed to a top plate alignment template and platform device. The device includes a frame receivable on or in a ground site. In one preferred embodiment, the frame is constructed from metal plates, beams, tubes or rods.

A plurality of tubular guide bores are arranged around and secured to the frame. Each of the guide bores is arranged at an angle outwardly and/or downwardly from the frame. A central tubular guide bore may also be provided which is substantially perpendicular to the planar frame.

The frame forms a platform for receipt and alignment of drilling or boring equipment used to drill or bore subterranean holes using the tubular guide bores as guides. It is particularly suited for coiled tubing applications.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
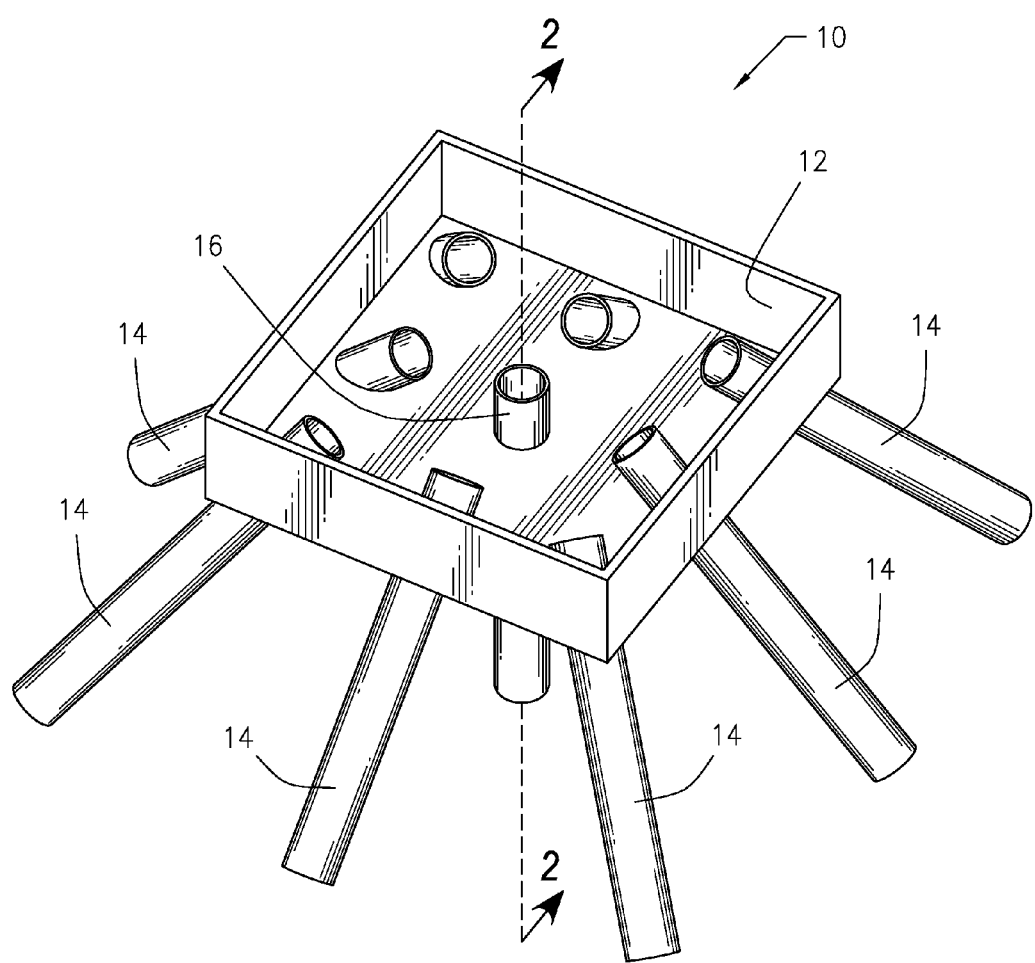
FIG. 1 illustrates a perspective view and FIGS. 2a and 2b illustrate alternate sectional views of a first preferred embodiment of a top plate alignment template device constructed in accordance with the present invention.
Figure 2A:
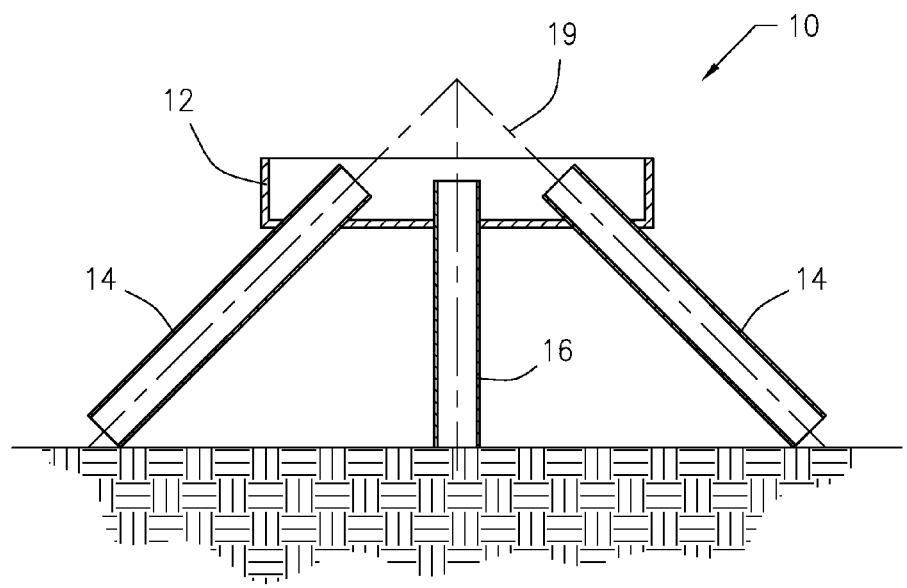
Figure 2B:
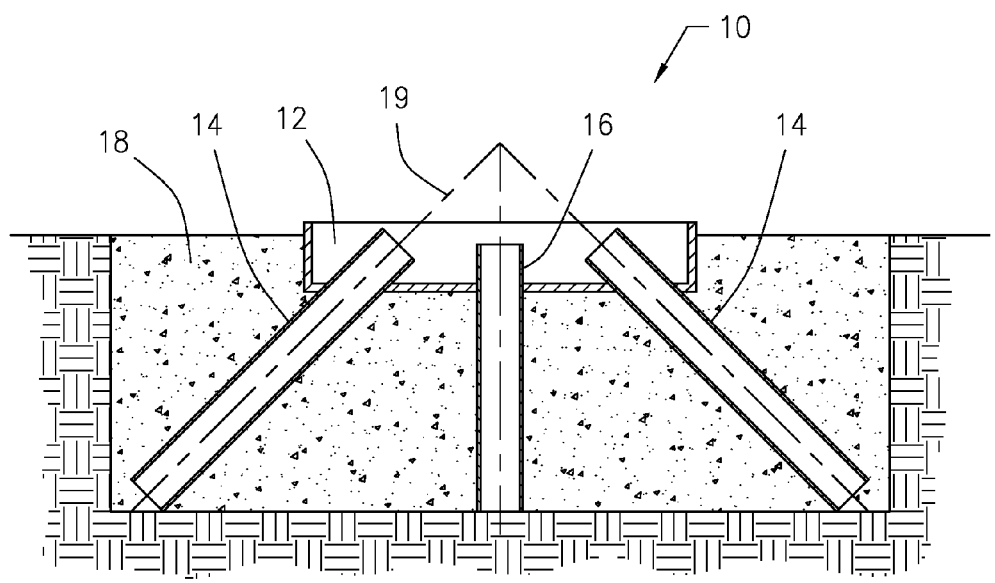

Referring to the drawings in detail, FIGS. 1, 2a and 2b show a perspective view of a first preferred embodiment 10 of a top plate alignment template device. The device 10 includes a frame 12 receivable on a ground site. The ground site for the frame 12 may be at ground level, below ground level, such as in an open pit, or on a sea bed. The frame 12 is constructed from metal plates or beams. The frame 12 may be welded or otherwise secured together.

A plurality of tubular guide bores 14 are arranged around and secured to the frame 12. Such guide bores are shown as straight but may also be curved or arcuate. The tubular guide bores 14 may be welded or otherwise secured to the frame 12. Each of the guide bores 14 is arranged at an angle extending outwardly and/or downwardly from the frame 12. The frame 12 is substantially planar and the guide bores 14 are arranged at a preferred angle of between thirty degrees (30°) and sixty degrees (60°) from the frame 12. Other angles are possible within the spirit and scope of the present invention.

Each of the guide bores 14 has an axis 19 so that the axes of the guide bores 14 extend from a common center point above the frame 12. In the embodiment shown in FIGS. 1, 2a and 2b, a central tubular guide bore 16 is also provided which is substantially perpendicular to the planar frame 12.

The invention may be utilized as a temporary device, in which case it would be removed after drilling and insertion of tubing is complete. Alternatively, the device may be permanently installed and remain in place.

FIGS. 2a and 2b are alternate sectional views taken along section line 2-2 of FIG. 1. The embodiment 10 shown in FIGS. 1 and 2a are arranged so that the frame 12 forms a mold form or receptacle for receipt of concrete 18 which is poured therein. Concrete 18 may be poured into the frame 12 and hardened in place. The device 10 with concrete forms a platform for drilling or boring equipment (not shown). In FIG. 2b, the device is placed in an open cavity and concrete poured around the device.

Once the drilling or boring equipment is mounted on the frame 12, a hole is drilled or bored by inserting the drill or bore through one of the guide bores 14. The process is repeated through each guide bore 14. The present invention permits drilling of multiple holes from a single position.

Figure 3:
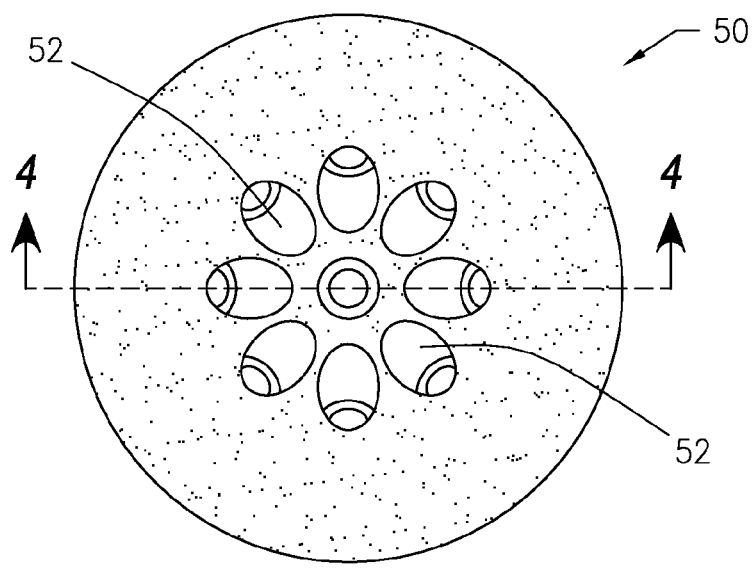
FIG. 3 illustrates a top view.
Figure 4:
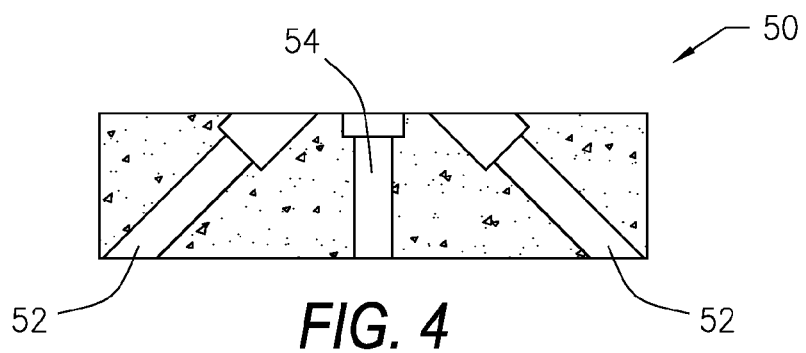
FIG. 4 illustrates a sectional view and FIG. 5 illustrates a perspective view of a second preferred embodiment of a top plate alignment template device.
Figure 5:
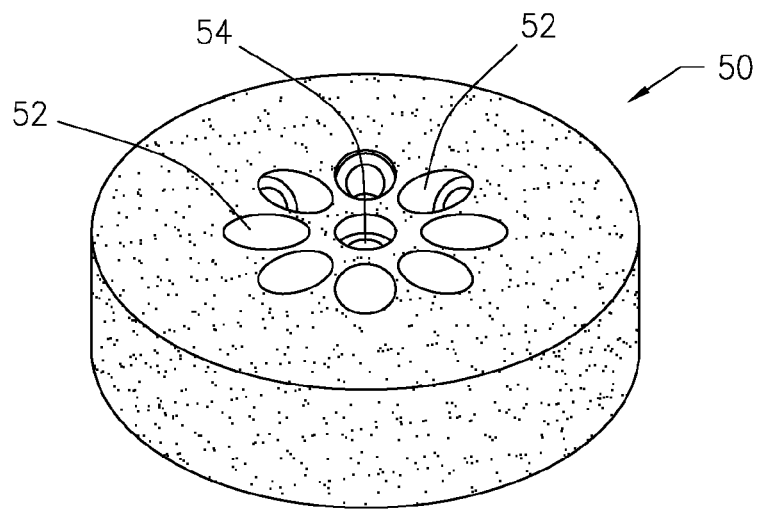

FIG. 3 illustrates a top view, FIG. 4 illustrates a sectional view and FIG. 5 illustrates a perspective view of a second preferred embodiment 50 of the top plate alignment template device. The device 50 is formed by pouring concrete or other initially formable material into a mold (not shown). The device 50 has a series of guide bores 52 therethrough. A central, mostly perpendicular, guide bore 54 is also provided. Again, the ground site for the device 50 may be at ground level, below ground level, or on a sea bed.

Figure 6:
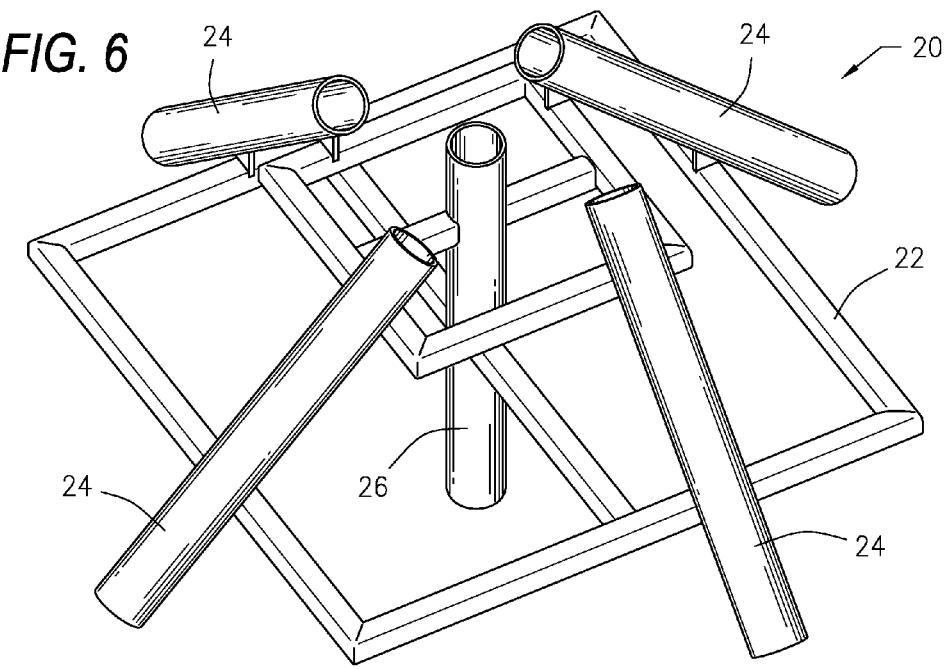
FIG. 6 illustrates a perspective view of a third preferred embodiment of a top plate alignment template device.

FIG. 6 illustrates a perspective view of a third preferred embodiment 20 of the top plate alignment template device of the present invention. A frame 22 is constructed from a plurality of metal tubes or metal rods. The frame 22 may be welded or otherwise secured together.

The frame 22 supports a plurality of tubular guide bores 24 which are arranged around the frame 22. The tubular guide bores 24 may be welded or otherwise secured to the frame 22. Each of the guide bores 24 is arranged at an angle extending outwardly and downwardly from the frame 22. The frame 22 is substantially planar and the guide bores 24 are arranged at an angle of between thirty degrees (30°) and sixty degrees (60°) from the frame 22.

Each of the guide bores 24 has an axis so that the axes of the guides bores 24 extend from a common center point above the frame 22. The embodiment shown in FIG. 6 also includes a central guide bore 26 which is substantially perpendicular to the frame 22.

Figure 7:
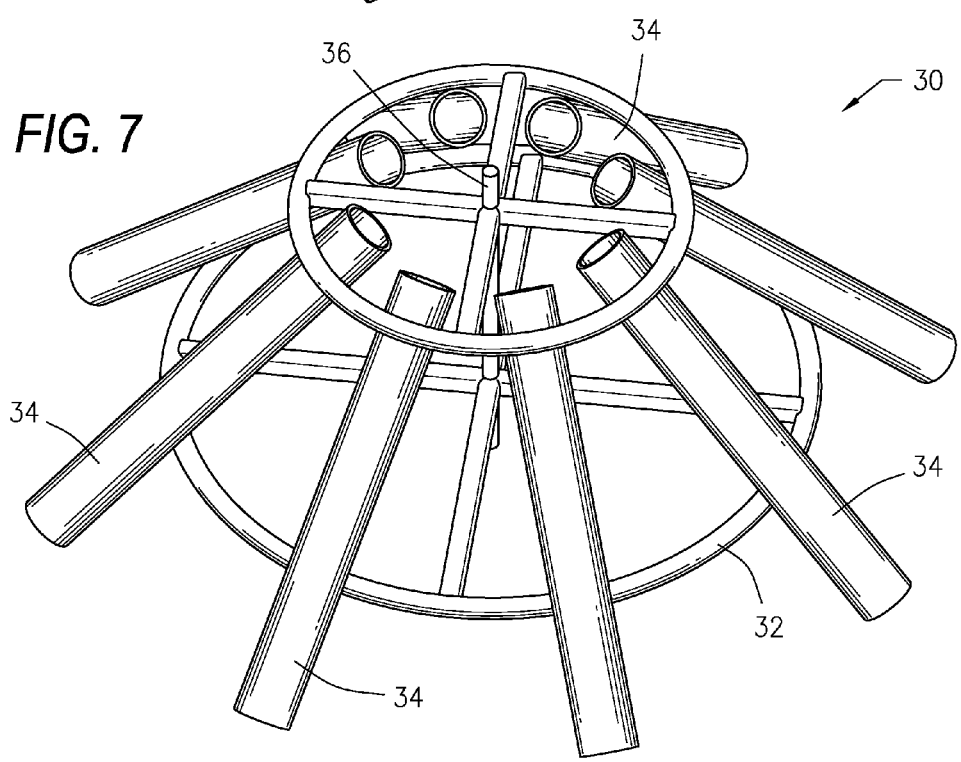
FIG. 7 illustrates a perspective view of a fourth preferred embodiment of a top plate alignment template device.

FIG. 7 illustrates a perspective view of a fourth preferred embodiment 30 of the top plate alignment template device of the present invention. A frame 32 is constructed from metal tubes or metal rods. The frame 32 may be welded or otherwise second together.

The frame 32 supports a plurality of tubular guide bores 34 which are secured to and spaced and arranged around the frame. The embodiment 30 shown in FIG. 7 also includes a central supporting pin 36 on the frame 32.

The central supporting pin 36 can be used for transportation and alignment of the template device 30 and may also be used as a support and an alignment tool for the drilling or boring equipment to be placed thereon.

Each of the tubular guide bores 34 is arranged at an angle extending outwardly and downwardly from the frame 32.

Figure 8:
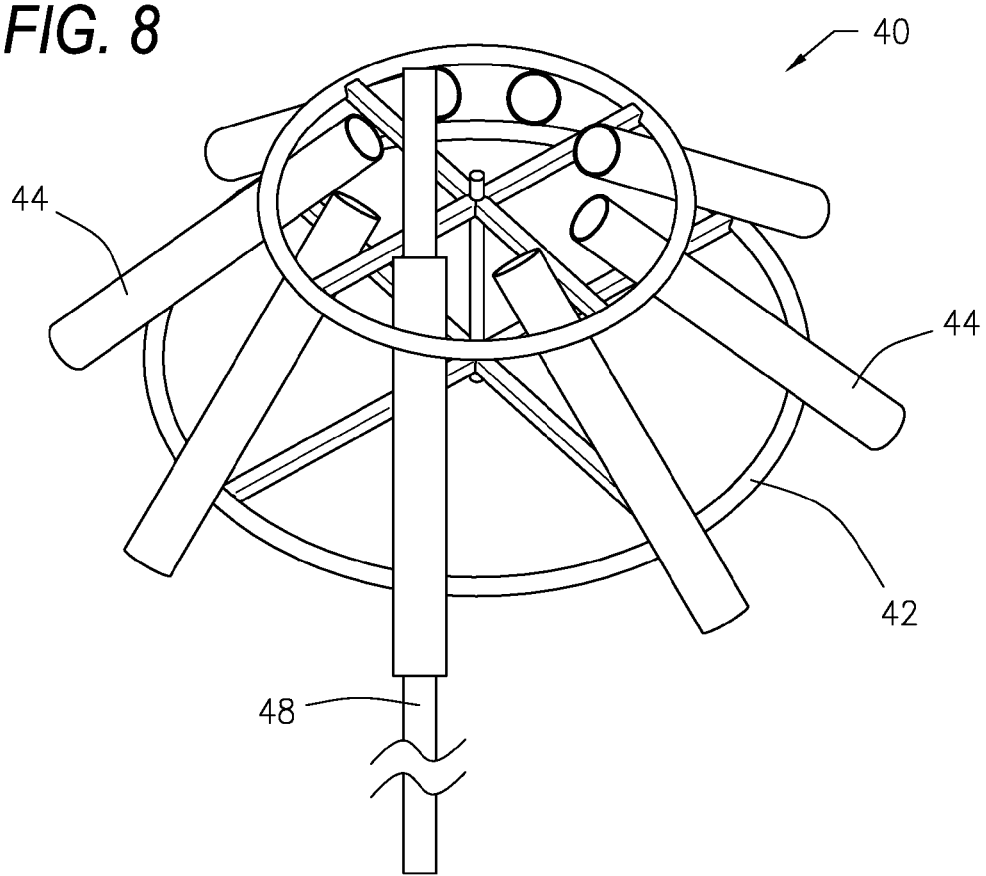
FIG. 8 illustrates a perspective view.
Figure 9:
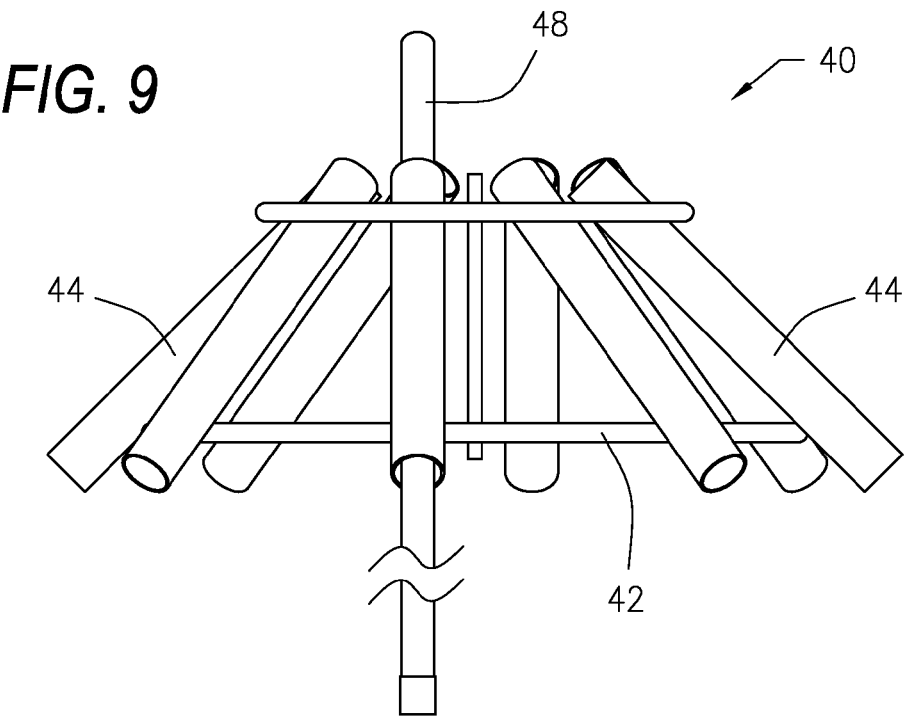
FIG. 9 illustrates a side view.
Figure 10:
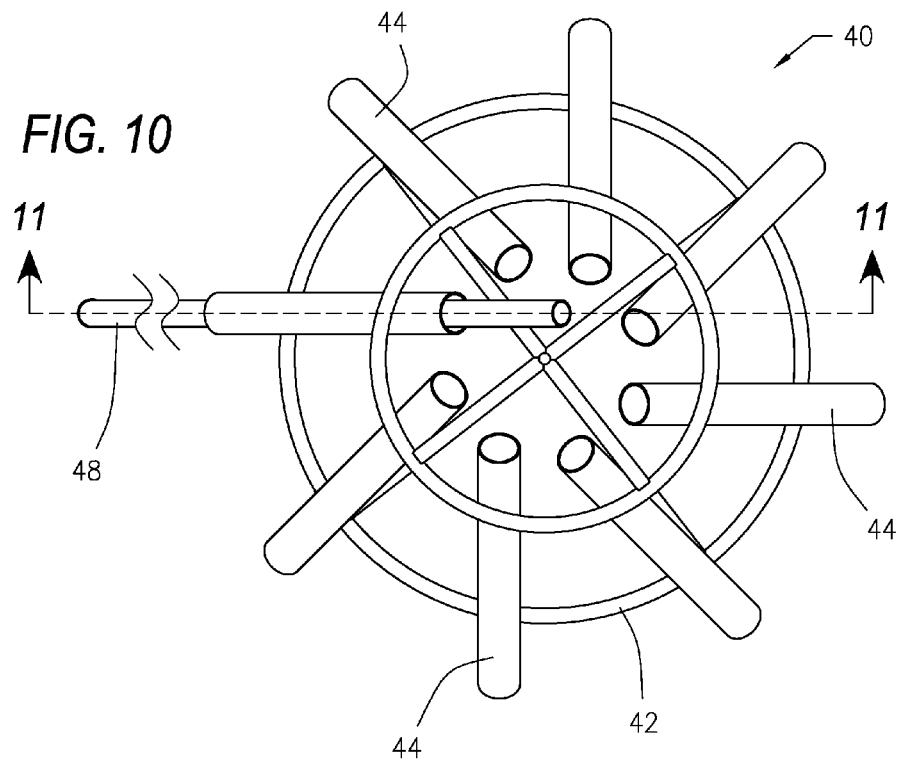
FIG. 10 illustrates a top view and FIG. 11 illustrates a sectional view of a fifth preferred embodiment of a top plate alignment template device.
Figure 11:
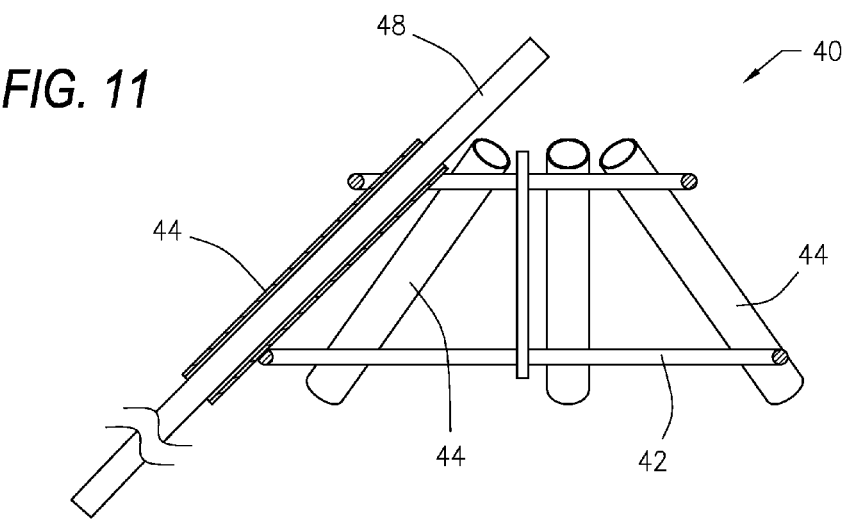
Figure 12:
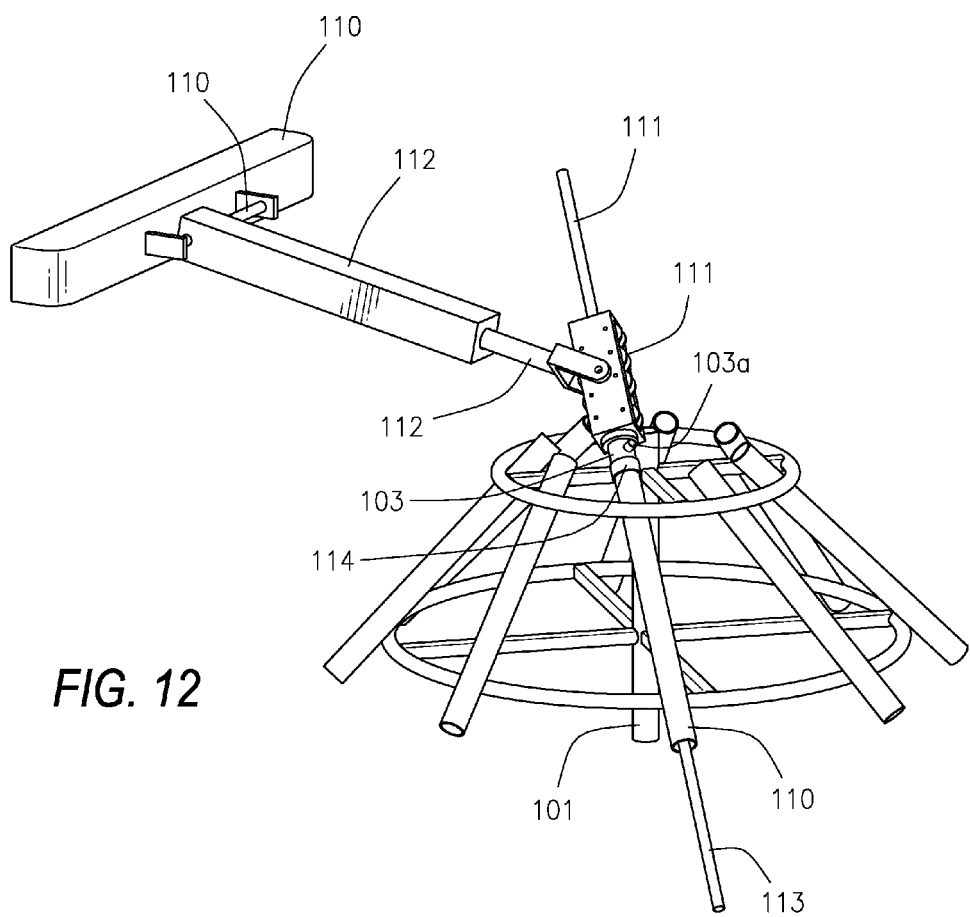
FIGS. 12 through 16 illustrate a top plate alignment template device of the present invention with an articulated injection head.
Figures 13, 14:
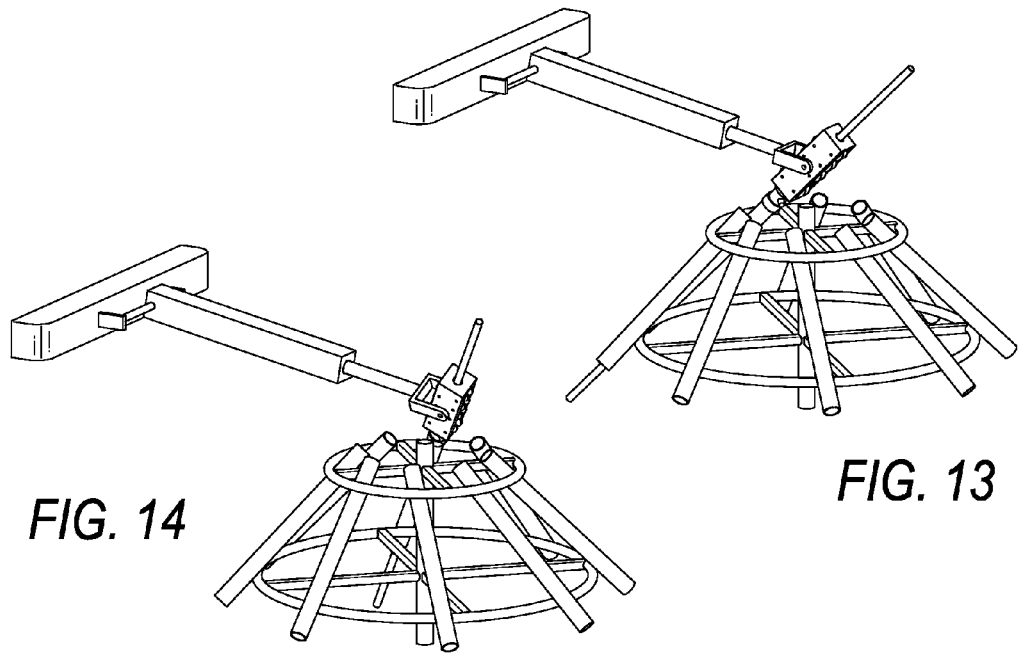
Figures 15, 16:
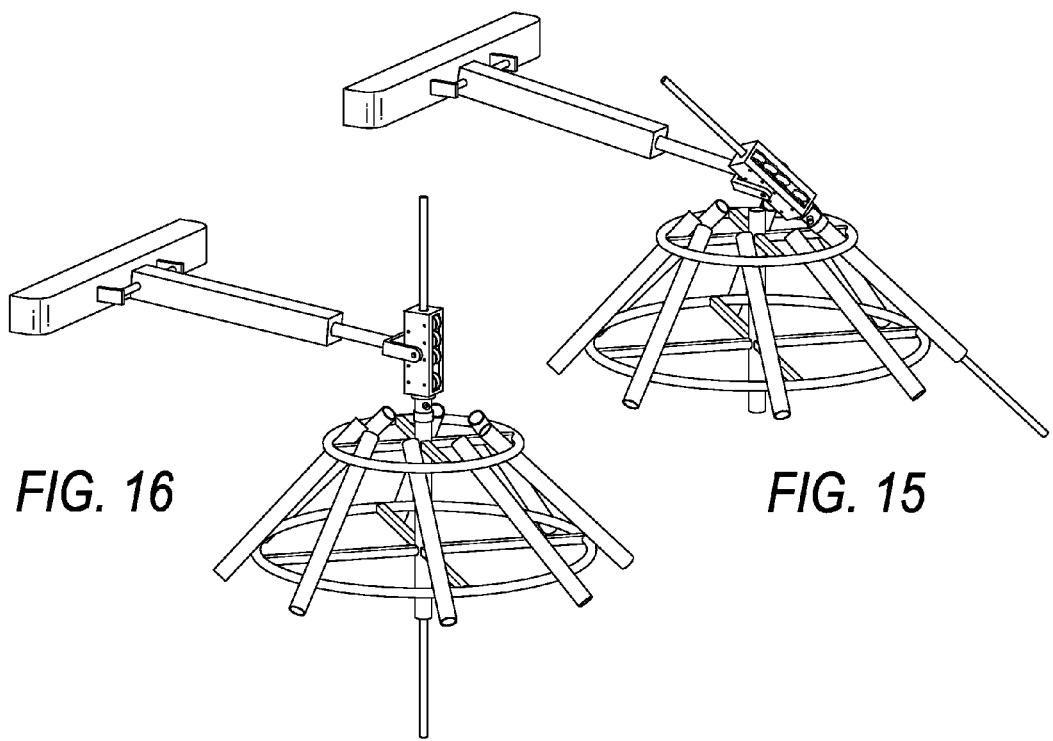

FIG. 8 illustrates a perspective view, FIG. 9 illustrates a side view, FIG. 10 illustrates a top view, and FIG. 11 illustrates a sectional view of a fifth preferred embodiment of the top plate alignment template device 40 of the present invention. The embodiment 40 shown in FIGS. 8 through 11 includes a frame 42 constructed of metal tubes or metal rods. The frame may be welded or otherwise secured together. The frame 42 supports a plurality of tubular guide bores 44 which are secured to and spaced and arranged around the frame 42. The tubular guide bores 44 may be welded or otherwise secured to the frame 42.

Each of the guide bores 44 is arranged at an angle extending outwardly and downwardly from the frame 42.

While each of the guide bores 44 has an axis, they do not converge at a single point as in the previous embodiments.

Drilling equipment (not shown) may be mounted on the top of the frame 42. A number of holes have already been drilled with tubing 48 inserted through the guide bores 44 and into the drilled holes. The tubing 48 may continue downhole along the same axis as the guide bores or, alternatively, may curve downward or in other directions such as accomplished in directional drilling.

To utilize the top plate alignment device that is proposed in this patent, an articulated injection head is required so that the complete rig, with injection head 104 attached on one end, can be moved onto or near the top plate device only once for drilling multiple bores through the top plate. The completed top plate embodiment 40 in FIGS. 8 through 11 are shown in FIGS. 12 through 16 with one embodiment of an articulated head assembly 100. An injection head 104 has wheels or chains that grab the drill tube 102 for pushing into or pulling out of the ground. It also included additional wheels alternatively positioned within the injection head 104 to straighten the drill tube if in coiled tubing version. The injection head assembly 100 includes a diverter "Y" with seal 103 for allowing the flow back of drilling fluids to a surface tank and a clamp 114 for connecting onto and sealing to the alignment tube 101.

In this embodiment, one rig end or bumper 117 has a slide pin 118 attached for allowing the injection head 104 to slide from side to side. Extension arm 116 with rotatable yoke 115 allows the injection head 104 to rotate and slide to and from the rig position. This allows full rotation of the injection head 104 to align with all alignment tubes 101. In this rig version manual positioning of the injection head 104 is shown to not interfere with the concept. In other versions, hydraulic or pneumatic cylinders or electric motors with gears would be installed to slide or rotate each component 115, 116 and 118 to position or align the injection head 104 to the correct alignment tube 101. Mechanical, electric, optical sensors (not shown) can be used to help or, with a computational device, automatically align said injection head to each alignment tube 101. With a preset position of all alignment tubes 101 onto the device, only one alignment and 2 other points are needed for automatic positioning onto each tube 101.

The operation to bore holes to install tools (heat exchange tubes, geophone or acoustic sensors, anchor cables or lines) is that a mobile rig with one end or bumper 117 moves near the previously installed top plate. The injection head 104 is extended using sliding of 115 in or out of 116, the side to side movement is controlled by sliding 116 on 118 and the yoke 115 is rotated to correctly position injection head 104, diverter with seal 103 and clamp 114 to the first alignment tube 101. Injection head 104 then straightens the drill tube 102 and forces it into the alignment tube 101 with cutting tool (not shown) attached. Any number of cutting tools can be used including drill bit, motor, abrasive nozzle, or scraper. The hole or bore is cut as the cutting tools are operated and the injection head 104 advanced the drill tube 102 into the earth. When the total depth or length of the drill tube has been reached, the injection head 104 reverses direction and the drill tube 102 is withdrawn from the newly cut bore. Heat exchange u-tubes or concentric tubes, acoustic sensors or geophones and other such tools can then be installed in the newly cut bore. The injection head 104 is decoupled from clamp 114 and then positioned or aligned onto the next alignment tube 101 on the top plate alignment device. This operation is repeated until all alignment tubes desired have been utilized and bores installed. Alternatively, the drill tube may be cut off at the surface and left in the bore when the desired depth is reached.

Whereas, the present invention has been described in relation to the drawings attached hereto, it should be understood that other and further modifications, apart from those shown or suggested herein, may be made within the spirit and scope of this invention.

What is claimed is:

1. A top plate alignment template device for subterranean drilling or boring which comprises:
   a frame receivable on a ground site; and
   a plurality of tubular guide bores on said frame, with each of said guide bores arranged at an angle outwardly and downwardly away from said frame wherein each of said guide bores has an axis so that the axes of said guide bores extend from a common center point above the frame.

2. A top plate alignment template device for subterranean drilling or boring as set forth in claim 1 including a central tubular guide bore perpendicular to said frame.

3. A top plate alignment template device as set forth in claim 1 wherein said frame is substantially planar and wherein each of said guide bores is arranged at an angle from ten degrees (10°) to eighty degrees (80°).

4. A top plate alignment template device as set forth in claim 1 wherein said frame is constructed from metal tubes.

5. A top plate alignment template device as set forth in claim 1 wherein said frame is constructed from concrete.

6. A top plate alignment template device as set forth in claim 1 wherein said frame includes a platform.

7. A top plate alignment template device as set forth in claim 6 wherein said platform supports and aligns a drilling rig or boring equipment thereon.

8. A top plate alignment template device as set forth in claim 1 wherein said frame has a central supporting pin.

9. A top plate alignment template device as set forth in claim 1 wherein said ground site is at ground level, is below ground level or is on a sea floor.

10. A top plate alignment template device as set forth in claim 1 wherein each of said plurality of guide bores receives ground source heat pump heat transfer tubes therethrough.

11. A top plate alignment template device as set forth in claim 1 wherein each of said plurality of bores receives anchoring equipment therethrough.

12. A top plate alignment template device as set forth in claim 1 wherein each of said plurality of bores receives acoustic sensor equipment therethrough.

13. A top plate alignment template device as set forth in claim 1 wherein said frame includes a mold receptacle for concrete.

14. A top plate alignment template device for subterranean drilling or boring which comprises:
    a frame receivable on a ground site; and
    a plurality of tubular guide bores on said frame, with each of said guide bores arranged at an angle outwardly and downwardly away from said frame wherein said frame is substantially planar and wherein each of said guide bores is arranged at an angle from between ten degrees (10°) and eighty degrees (80°).

15. A top plate alignment template device for subterranean drilling or boring as set forth in claim 14 including a central tubular guide bore perpendicular to said frame.

16. A top plate alignment template device as set forth in claim 14 wherein said frame is constructed from metal tubes.

17. A top plate alignment template device as set forth in claim 14 wherein said frame is constructed from concrete.

18. A top plate alignment template device as set forth in claim 14 wherein said frame includes a platform.

19. A top plate alignment template device as set forth in claim 18 wherein said platform supports and aligns a drilling rig or boring equipment thereon.

20. A top plate alignment template device as set forth in claim 14 including an articulated injection head assembly.

21. A top plate alignment template device as set forth in claim 20 wherein said injection head assembly is positioned by hydraulic cylinders.

22. A top plate alignment template device as set forth in claim 20 wherein said injection head assembly is positioned by pneumatic cylinders.

23. A top plate alignment template device as set forth in claim 20 wherein said injection head assembly is positioned by electric motors.

24. A top plate alignment template device as set forth in claim 20 wherein a drill tube is inserted and used to drill a bore to a desired depth and then cut off at the surface and left in the drilled bore.

* * * * *